US006480834B1

(12) United States Patent
Engle et al.

(10) Patent No.: US 6,480,834 B1
(45) Date of Patent: Nov. 12, 2002

(54) METHOD AND APPARATUS FOR SERVING FILES FROM A MAINFRAME TO ONE OR MORE CLIENTS

(75) Inventors: Bruce Engle, San Francisco, CA (US); Kevin Parker, Danville, CA (US)

(73) Assignee: Serena Software, Inc., San Mateo, CA (US)

( * ) Notice: Subject to any disclaimer, the term of this patent is extended or adjusted under 35 U.S.C. 154(b) by 0 days.

(21) Appl. No.: 09/441,764

(22) Filed: Nov. 17, 1999

(51) Int. Cl.[7] .............................. G06F 17/30; G06F 7/00
(52) U.S. Cl. ...................... 707/2; 707/1; 707/2; 707/10; 707/100; 707/104.1; 709/200; 709/217; 709/203; 711/1; 711/2; 711/3; 711/100; 711/111; 711/136
(58) Field of Search .............................. 707/201, 1–10, 707/100–104.1, 200–205; 709/200–219; 711/1–3, 100, 111–146

(56) References Cited

U.S. PATENT DOCUMENTS

| | | | | |
|---|---|---|---|---|
| 5,146,561 A | * | 9/1992 | Carey et al. ................... 707/10 |
| 5,390,318 A | * | 2/1995 | Ramakrishnan et al. ..... 711/136 |
| 5,717,951 A | * | 2/1998 | Yabumoto .................... 707/100 |
| 5,809,527 A | * | 9/1998 | Cooper et al. ............... 707/200 |
| 5,857,203 A | * | 1/1999 | Kauffman et al. ............. 707/10 |
| 5,878,228 A | | 3/1999 | Miller et al. |
| 5,893,116 A | * | 4/1999 | Simmonds et al. .......... 707/201 |
| 5,944,789 A | * | 8/1999 | Tzelnic et al. .................. 707/7 |
| 5,948,062 A | * | 9/1999 | Tzelnic et al. ................. 707/10 |
| 5,956,712 A | * | 9/1999 | Bennett et al. ................ 707/10 |
| 6,061,714 A | * | 5/2000 | Housel et al. ................ 709/203 |
| 6,067,354 A | * | 5/2000 | Bauer et al. ............ 379/115.01 |
| 6,192,408 B1 | * | 2/2001 | Vahalia et al. ............... 709/217 |
| 6,199,107 B1 | * | 3/2001 | Dujari ......................... 709/219 |
| 6,332,163 B1 | * | 12/2001 | Bowman-Amuah ......... 709/217 |

\* cited by examiner

Primary Examiner—Gneta L. Robinson
Assistant Examiner—Linh Black
(74) Attorney, Agent, or Firm—Innovations Partners; Charles Gotlieb

(57) ABSTRACT

A method and apparatus provides random access to mainframe files that are accessed using an operating system that does not provide random access. This allows a computer system such as a mainframe on which random access is not supported to act as a file server for a computer system on which random access is supported without requiring the entire file to be downloaded to the client computer system.

23 Claims, 4 Drawing Sheets

METHOD AND APPARATUS FOR SERVING FILES FROM A MAINFRAME TO ONE OR MORE CLIENTS

RELATED APPLICATIONS

The subject matter of this application is related to the subject matter of application Ser. No. 09/441,795, entitled, "METHOD AND APPARATUS FOR ACCESS TO FILES STORED ON A MAINFRAME USING A PERSONAL COMPUTER USER INTERFACE", filed by Bruce Engle and Kevin Parker on Nov. 17, 1999; application Ser. No. 09/442,018, entitled, "METHOD AND APPARATUS FOR CONVERTING FILES STORED ON A MAINFRAME COMPUTER FOR USE BY A CLIENT COMPUTER", filed by Bruce Engle and Kevin Parker on Nov. 17, 1999; and application Ser. No. 09/441,765, entitled, "SYSTEM AND METHOD FOR LOGGING INTO A MAINFRAME COMPUTER SYSTEM" filed on Nov. 17, 1999 by Bruce Engle and Kevin Parker, each having the same assignee as this application and each is incorporated herein by reference in its entirety.

FIELD OF THE INVENTION

The present invention is related to computer software and more specifically to client-server computer software.

BACKGROUND OF THE INVENTION

Conventional client-server computer systems allow some or all of a file to be created, modified and read on one or more client computer systems and stored on a server. The server only provides the files it serves to the client computer systems. If computer software applications on the server also use the files, problems can result due to incompatibilities between the file systems used by the applications in the client and the applications in the server. For example, if the server is a mainframe computer system such as a S/390 running the MVS operating system commercially available from IBM Corporation of White Plains, New York and the clients are personal computer systems such as conventional Pentium III compatible systems commercially available from Dell Computer Corporation of Round Rock, Tex. running the Windows 9X/NT operating system commercially available from Microsoft Corporation of Redmond, Wash., certain problems result from the incompatibility of the operating systems of these two types of systems.

Applications running under the Windows operating system request a portion of a file by specifying a byte offset to identify the beginning of the portion and a number of bytes to specify the size of the portion. The first byte need not start on any form of boundary. If several sets of bytes are requested, they may be requested in random order. This type of file access is known as random access, because there are no restrictions on how the access may be performed. On the other hand, applications running under MVS can only request bytes in the order in which they are stored in the file. To request a portion of the file that is stored prior to a portion just requested requires resetting the file. In addition, the requested portion must begin on block or record boundaries.

One way to allow a personal computer to randomly access an MVS file is to download the entire file to the personal computer system, work on it there, and if changes have been made, upload the file back to the mainframe computer system. However, such an approach makes inefficient use of the memory of the personal computer and the network connection between the personal computer and the mainframe computer system.

What is needed is a method and apparatus that can provide a client computer random access to a mainframe file without requiring the client computer to download the entire file.

SUMMARY OF INVENTION

A method and apparatus caches on the mainframe portions of a file being read and provides from the cache the portion requested by the client computer system, allowing random access to the file. A file being written is enqueued and the entire file may be placed into the cache, written to, and stored onto the mainframe when the file is closed. Any file conversions that will be performed on the mainframe are performed before the portion of the file is stored in the cache, and these conversions are performed according to properties for a folder with which the file is associated by the client computer system.

DETAILED DESCRIPTION OF A PREFERRED EMBODIMENT

Figure 1:
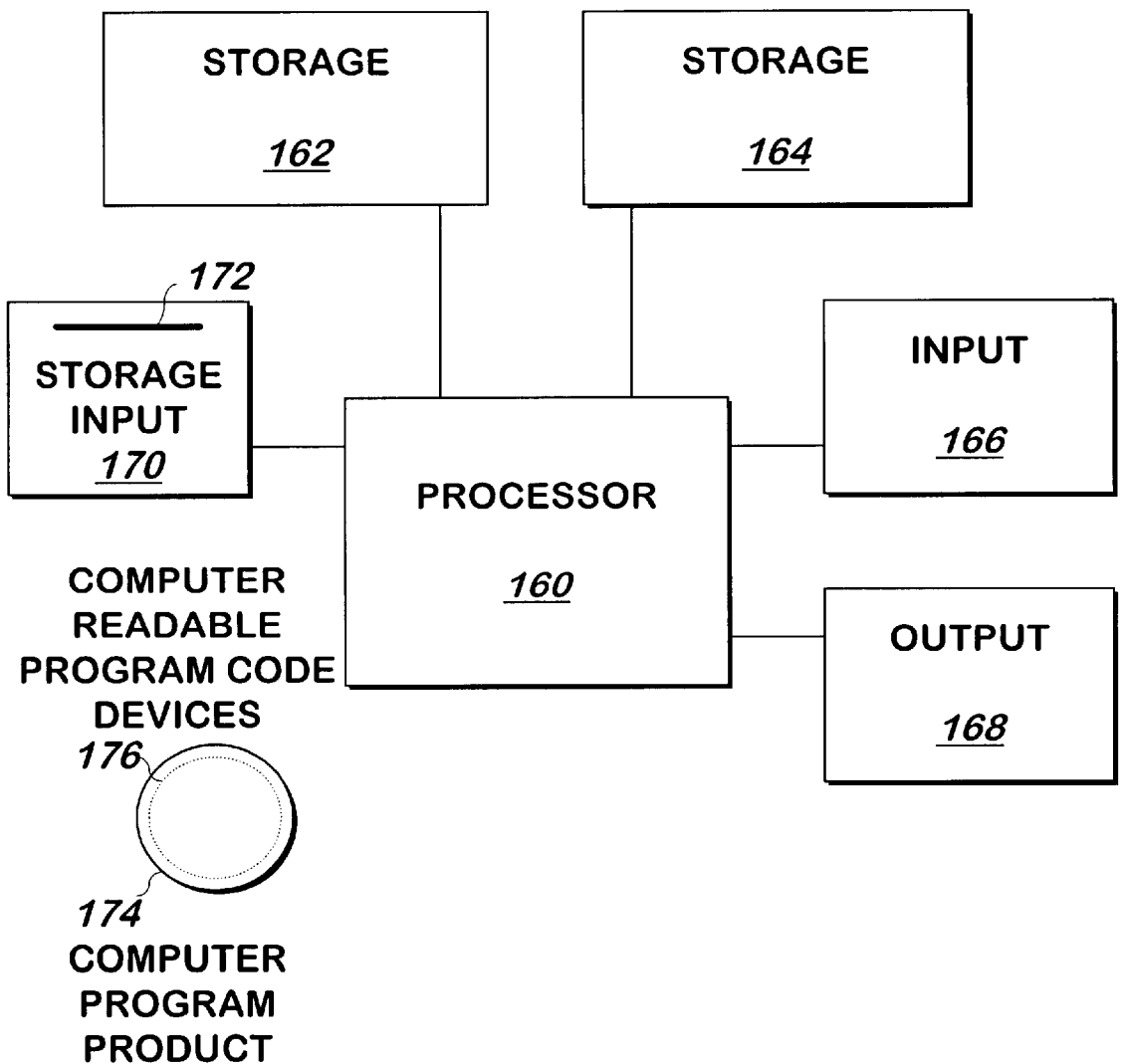
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional mainframe or client computer system described above, although other systems may be used.

Figure 2:
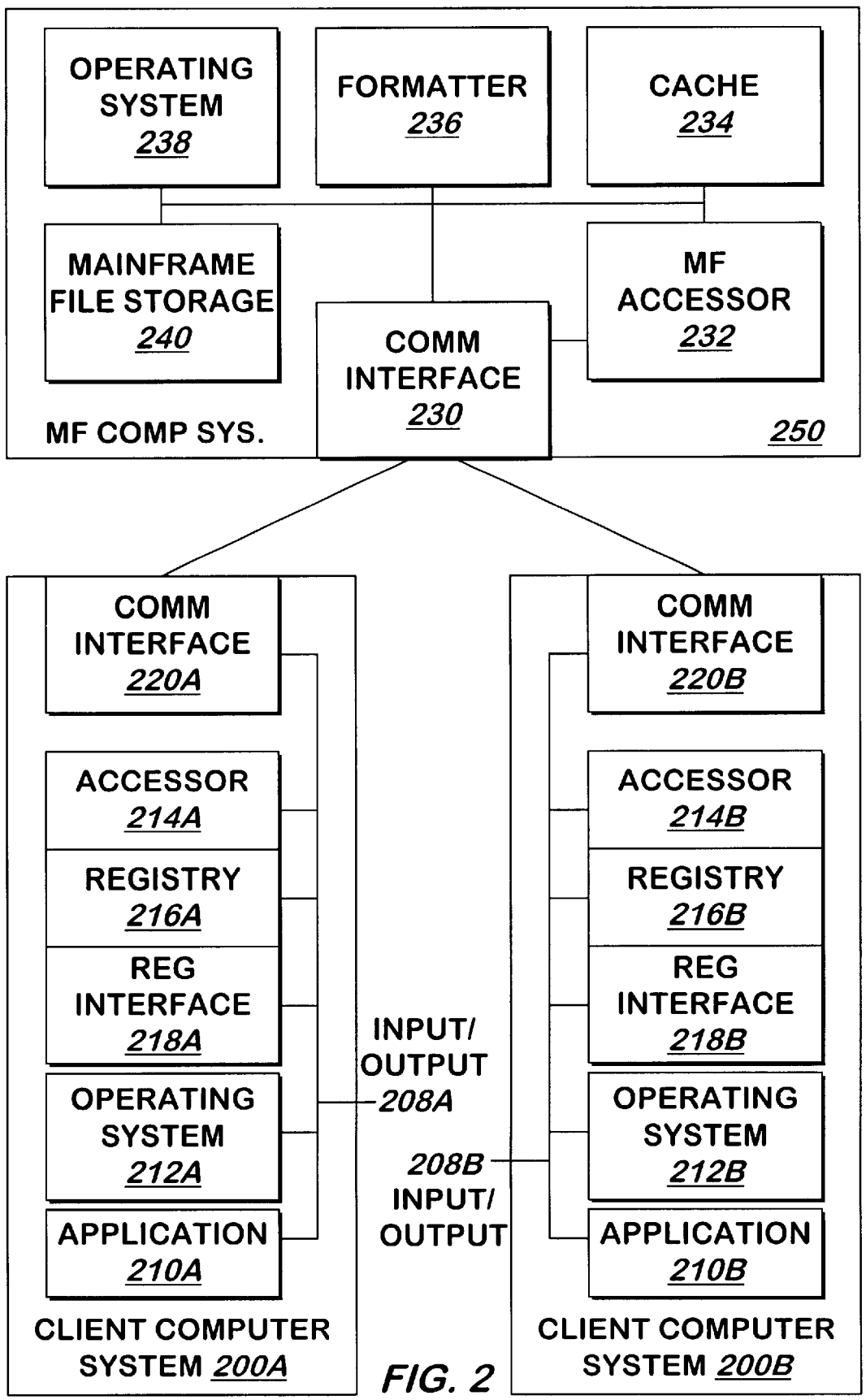
FIG. 2 is a block schematic diagram of an apparatus for randomly accessing files according to one embodiment of the present invention.

Referring now to FIG. 2, an apparatus for randomly accessing files is shown according to one embodiment of the present invention. Mainframe computer system 250 is coupled to client computer systems 200A, 200B. Although each client computer system 200A, 200B is shown identically, it is not necessary that each client computer system 200A, 200B be identical to one another. As shown in the Figure, two client computer systems 200A, 200B are coupled to one mainframe computer system 250 although any number of interconnected client computer systems 200A, 200B and mainframe computer systems 250 may be used. Unless otherwise noted or implied, the description below discusses the operation of client computer system 200A as a representative one of client computer systems 200A, 200B. Elements 208B, 210B, 212B, 214B, 216B, 218B, 220B operate identically to elements 208A, 210A, 212A, 214A, 216A, 218A, 220A, repectively.

The interconnection is made between each client computer system 200A, 200B and each mainframe computer system 250 using interfaces 220A, 220B, and 230. Interfaces 220A, 230 may be conventional network interface cards coupled together via any form of network, along with a conventional communications process running between them. The communications process in communications interface 220A may be loaded at Windows startup or started manually. The communications process in communications interface 230 may be a conventional communications process running as a started task under the operating system 238.

Application 210A is a conventional application that requests to read or write records using an offset to a file by sending to operating system 212A a file handle, an offset and a number of bytes. Application 210A may be a conventional database, spreadsheet, word processing or other conventional application or may be a utility program such as the conventional Windows Explorer product provided with Windows 9X/NT, operated via input/output 208A coupled to a conventional keyboard/monitor/mouse combination. Although only one application is illustrated, there may be any number of applications 210A coupled to operating system 212A and each application 210A on a single client computer system 200A may use the apparatus described herein to randomly access different files, with all of the files open simultaneously.

If application 210A wishes to open to a file, it will send to operating system 212A a conventional command to open the file and include an identifier of the file. The identifier will contain the filename and path, including a UNC identifier or a drive letter.

Accessor 214A is registered to operating system as described above in copending application Ser. No. 09/441, 795 and receives read requests from operating system 212A for a drive designator or UNC identifier that represents mainframe computer system 250. Because accessor 214A is registered to operating system 212A as the network service provider for the drive letter or the UNC services provider for the UNC identifier, operating system 212A will assign a handle to the file and provide the handle and the open command including the drive and path to accessor 214A if the path or UNC in the identifier of the file received with the open command matches the drive designator registered to operating system 212A or recognized by accessor 214A when operating system 212A broadcasts the UNC. In one embodiment, accessor 214A maps the filename and path of the file to a handle by storing them in a list.

In one embodiment, some open commands contain parameters describing conditions under which the open command should fail. These conditions may include whether the file exists or doesn't exist and whether the file is open for read access or open for write access. Instead of opening the file on the mainframe computer system 250, accessor 214A attempts to ascertain whether the open command should fail. To do this, accessor 214A transmits to mainframe accessor 232 via communications interfaces 220A, 230 a request to identify whether the file exists on the system and is not enqueued for exclusive access if the open command contains parameters indicating that it should fail under one or more conditions related to the existence of the file and its status. The request includes the filename received by accessor 214A.

Mainframe accessor 232 uses operating system 238 to identify whether the file exists and is open for reading or writing and provides this information to accessor 214A. Accessor 214A uses this information to simulate the response operating system 212A would have to the various parameters used with conventional open file type APIs that induce a failure or error based on the existence or status of the file. Accessor 214A returns to operating system 212A any failure response to the open command consistent with the failure response that would be returned by operating system 212A for an open command for a file local to client computer system 200A. Operating system 212A forwards the response to application 210A. In one embodiment, accessor 214A only provides a failure response to an open command based on the existence of the file, but does not fail because of denial of access until a write command is received.

Once a file is opened, application 210A may send to operating system 212A a command to read the file, write the file, or close the file.

If application 210A sends operating system 212A a command to read the file, operating system 212A sends the command to accessor 214A. The read command received by accessor 214A contains the handle of the file to be read, the byte offset at which to begin reading and number of bytes to be read. Accessor 214A looks up the path it stored for the handle when it received the open command and reads from registry 216A the properties for the folder corresponding to the path corresponding to the handle in the command.

As described in copending application Ser. Nos. 09/441, 795 and 09/442,018, the registry 216A contains a hierarchical arrangement of folders that may be associated with one or more files (called partitioned data sets) on the mainframe computer system 250. Each folder has properties including a filenames property that include which mainframe files are to be associated with the folder. The properties are entered into registry using registry interface 218A by a user using input/output 208A or by application 210A, as described in copending application Ser. Nos. 09/441,795 or 09/442,018.

In one embodiment, in addition to the filenames property described above, each folder in registry 216A also has properties that include the mode of the files on the mainframe associated with the folder. The mode may be text mode or binary mode. In text mode, any trailing spaces in the file are trimmed and a carriage return and line feed sequence is appended to the end of each record in the file before the file or portion thereof is transferred from the mainframe computer system 250 to the client computer system 200A as described above in copending application Ser. No. 09/442,018. If the mode property is binary mode, no such alteration of the file is performed. In such case, a record size property is also stored in registry 216A as described above. Accessor 214A reads the mode property and if the mode property is binary mode, accessor 214A also reads the record size property from registry 216A.

Accessor 214A sends mainframe accessor 232 a request to read the file. In one embodiment, the request includes the filename, byte offset, number of bytes and the text mode property to mainframe accessor 232 via communications interface 220A and communications interface 230. The request also contains the record size property if the text mode property is binary.

Mainframe accessor 232 enqueue's the file for shared access and requests the record format of the file using operating system 238. The record format can be fixed length blocks (RECFM=F), fixed length blocks except for the possibility of a short block at the end (RECFM=U), and variable length blocks with the start of each block in the file preceded by an RDW character (RECFM=V). If operating system 238 identifies the RECFM as F or U, mainframe accessor 232 identifies the block size using the LRECL value in the data control block that operating system 238 provides when it opens the file.

If the mode property received in the request is text mode, mainframe assessor 232 provides to formatter 236 the offset and size of the portion of the file specified in the request and the filename and signals formatter 236 to perform the conversion and fill a cache 234 with the specified portion of the file. If the mode property is text, there may be a different number of bytes stored in the file on the mainframe computer system 250 than the version of the file client computer system 200 will receive. Because formatter 236 receives the offset and number of bytes from the perspective of the client computer system 200 yet it must search through the file as stored on the mainframe, as formatter 236 scans the file to locate the bytes to convert and store into the cache must adjust its count of bytes in the file to match the count from the after-conversion point of view.

For each block it retrieves, formatter 236 counts the number of bytes that will be passed back to the client computer system 200 by subtracting the number of trailing spaces from the size of the block if the RECFM is F or U, and adding two (to correspond to the carriage return and line feed characters). Formatter 236 then cumulates the result with prior results of any prior block in the file. Formatter 236 then identifies if any portion of the block falls within the portion of the file requested using the offset and number of bytes in the request. If so, formatter 236 converts the block by removing trailing spaces and adding a carriage return and line feed sequence to the end of each block or the portion of the block that is within the requested portion of the file as formatted.

Formatter 236 then stores the formatted block into cache 234. Cache 234 is conventional storage such as memory or disk storage and may be a data space. Formatter 236 continues retrieving additional blocks until a portion of the cache 234 assigned to the file by formatter 236 is full or the end of the file is reached. In one embodiment, formatter 236 then signals operating system 238 to dequeue the file and in another embodiment, the file is dequeued when it is closed.

If the mode property is binary mode, mainframe file accessor 232 provides the record size property received from accessor 214A in the request to formatter 236. Formatter 236 uses the same procedure described above to fill the cache 234 by assuming that all bytes after the record size number of bytes in each block are trailing spaces and discarding them before adding the carriage return and line feed.

As formatter 236 fills cache 234, formatter 236 maintains the after-conversion byte count of the first byte in the cache and a pointer to the head of the cache. When formatter 236 has filled cache 234, formatter 236 signals mainframe accessor 232 with the byte count of the first byte in the cache and the pointer. Mainframe accessor 232 returns the requested bytes from the cache 234 using the pointer, and using the number of bytes and the offset in the request. The bytes are returned via communications interfaces 230, 220 to accessor 214A. Accessor 214A provides the bytes to the requesting application 210A via operating system 212A. In one embodiment, mainframe accessor 232 keeps a table of bytes it provides so that the bytes can be locked for use as described below.

Application 210A may send subsequent read commands. In one embodiment, accessor 214A generates a read request as described above, but does not retrieve and send with the request the properties for read commands following the first read command for a file that is made by the same application 200 until the file is closed. Accessor 214A internally stores with the handle an indication as to whether the properties for the file have already been sent with a read request. Accessor 214A does not send properties with read requests received when the indication is that the properties have already been sent.

If another read request for a file that has already been read is received by mainframe accessor 232, mainframe accessor 232 identifies whether the requested bytes are in the cache 234. If not, mainframe accessor 232 signals formatter 236 as described above with the offset and number of bytes. Formatter 236 also maintains the byte count of the first byte in cache 234. If the offset is higher than the byte count, formatter 236 retrieves additional blocks from the file as described above to ensure that the requested bytes are in the cache 234. Formatter 236 converts the blocks as described above and stores the blocks in the cache 234. If the offset is lower than the byte count, formatter 236 resets the file and refills the cache as described above using the new request.

In one embodiment, multiple files may be open at any one time. In such embodiment, cache 234 holds several files at one time. The cache 234 is divided into multiple caches along page boundaries or other similar boundaries. Mainframe accessor 232 provides to formatter 236 a page identifier to identify the file when it requests formatter to perform any action. The offset provided by formatter 236 to identify the start of the cache is relative to the page boundary.

In one embodiment, two or more clients may have the same file open for reading at the same time. In such embodiment, mainframe accessor 232 receives as part of the read request from accessor 214A or from communications interface 220 an identifier of the client computer system 200A or 200B from which any request is made. Mainframe accessor 232 provides this identifier to formatter 236, which provides it in the response formatter 236 provides to mainframe accessor 232. Mainframe accessor 232 uses the identifier to route the response to the proper client computer system 200A or 200B by providing communications interface 230 the identifier of the proper client computer system 200A or 200B along with the response.

When mainframe accessor 232 receives a read request from a different application 210B or client computer system 200B for a file that it already has in its cache, mainframe accessor 232 compares the properties it has stored for the file in the cache. If the properties received with the subsequent read request are incompatible with the properties for the file in the cache, a second instance of the file may be cached using the different properties and used to respond to read requests as described above.

In addition to reading a file, application 210A can send commands to write a file. If application 210A sends a write command to operating system 212A, operating system 212A routes the command to accessor 214A in the same manner as the read command as described above. The write command will include the data to be written or a pointer thereto, a file handle and optionally an offset in which to write the data. If no offset is received, the data is written to the end of the file. Accessor 214A maintains a table of file handles of open files and their respective paths and filenames as described above and converts the file handle in the write command to a path and filename. Accessor 214A sends a write command including the filename or a handle, the data and any offset to mainframe accessor 232 via the path described above.

Mainframe accessor 232 maintains a list of files to which it has previously written until it receives a close command for the file described below. If the filename is not in the list of files mainframe assessor 232 maintains, mainframe accessor 232 signals formatter 236 to open the file for writing.

Formatter 236 signals operating system 238 to enqueue the file for exclusive access and provide the file stored in mainframe file storage 240. Formatter 236 receives the file, converts the file as described above if the type property is text and stores the result in a portion of cache 234, such as a dataspace. Unlike the case for a read command, for a write command formatter 236 places the entire file in the portion of the cache 234. Formatter 236 provides a handle to the portion of the cache to mainframe accessor 232 to allow mainframe accessor 232 to identify the location of the file in the cache 234. Formatter 236 returns to mainframe accessor 232 the number of bytes in the cache.

Mainframe accessor 232 writes the data at the location in the cache specified or implied by the request it receives. In one embodiment, mainframe accessor 232 only writes past the end of the file, and in another embodiment, mainframe accessor 232 will write the data it receives wherever specified in the file. In both cases, if the offset describing the point at which to write the file is greater than the number of bytes in the file, mainframe accessor 232 will write zeros or null characters between the end of the file and the offset specified, and then write the data it received.

In one embodiment, if the mode property received by mainframe accessor 232 is text, mainframe accessor 232 will strip any trailing spaces that occur before the carriage return and line feed that define the end of a record for all records it receives for writing into a file. In another embodiment, no such spaces are removed by mainframe accessor 232.

In one embodiment, if a file is written to, mainframe accessor 232 will deny any further write command received from another client computer system 200 and accessor 214A will deny write commands received from a different application on the same client computer system until the client computer system 200 or application 210A writing the file sends a close request or close command. In one embodiment, read access is allowed by another client computer system 200 or another application 210A following a write command or write request.

In one embodiment, accessor 214A only retrieves and provides the properties of the file for the first write request it sends for a particular application for a particular file. Subsequent write requests are sent to mainframe accessor 232 without the properties similar to read requests as described above.

When application 210A wishes to close the file, application 210A sends a close command to operating system 212A along with the file handle. Operating system 212A routes the close command and handle to accessor 214A as described above. Accessor 214A sends to mainframe accessor 232 a close request and the handle or the filename which accessor 214A retrieves from the internal list it maintains using the handle from the command.

If mainframe accessor 232 determines the file is in the list of files it has written since it opened the file, mainframe accessor 232 provides an identifier of the file, the type property to formatter 236 and the number of bytes corresponding to the file along with a request to save the file in cache 234. Formatter 236 converts the file if the type property is text by placing text up to a carriage return and line feed into a record, stripping the carriage return and line feed and padding with null or zeros to fill fixed length records if the RECFM=F or U. In the case of RECFM=U, when the last byte is read, the last record is not padded. If the RECFM=V, formatter 236 precedes each output record with an RDW character. The record sizes used by formatter 236 is the LRECL parameter in the data control block for the file.

If the file did not exist when it was opened, formatter 236 provides to operating system 238 the LRECL parameter when it opens the file. In such case, at the time of the first write command, formatter 236 checks to see if the file exists in mainframe file storage 240. If not, formatter 236 signals mainframe accessor 232. Mainframe accessor 232 requests from accessor 214A the block size. Accessor 214A retrieves from registry 216A the block size corresponding to the path of the file. Accessor 214A provides the block size to mainframe accessor 232, which passes it to formatter 236.

Formatter attempts to fill blocks according to the block size specified by the VTOC, except for the final block. Formatter 236 directs operating system 238 to save the file in mainframe file storage 240. Mainframe accessor 232 then removes the filename from the list of files it has written since the file was opened.

If the file corresponding to the close request is not in the list of files to which mainframe accessor has written, mainframe accessor 232 signals formatter 236 that the space occupied in the cache 234 is available for reuse.

In one embodiment, mainframe accessor 232 maintains a list of the files for which a read or write command has been received and the client computer system 200A, 200B reading or writing the file until a close command is received and the entry is removed from the list. In one embodiment, any close request is ignored by mainframe accessor 232 other than to remove the entry corresponding to the file and the requesting client computer system 200A, 200B from the list until received from the last client computer system that has read or written the file without closing it. At that point, the close request is performed as described above.

Figure 3:
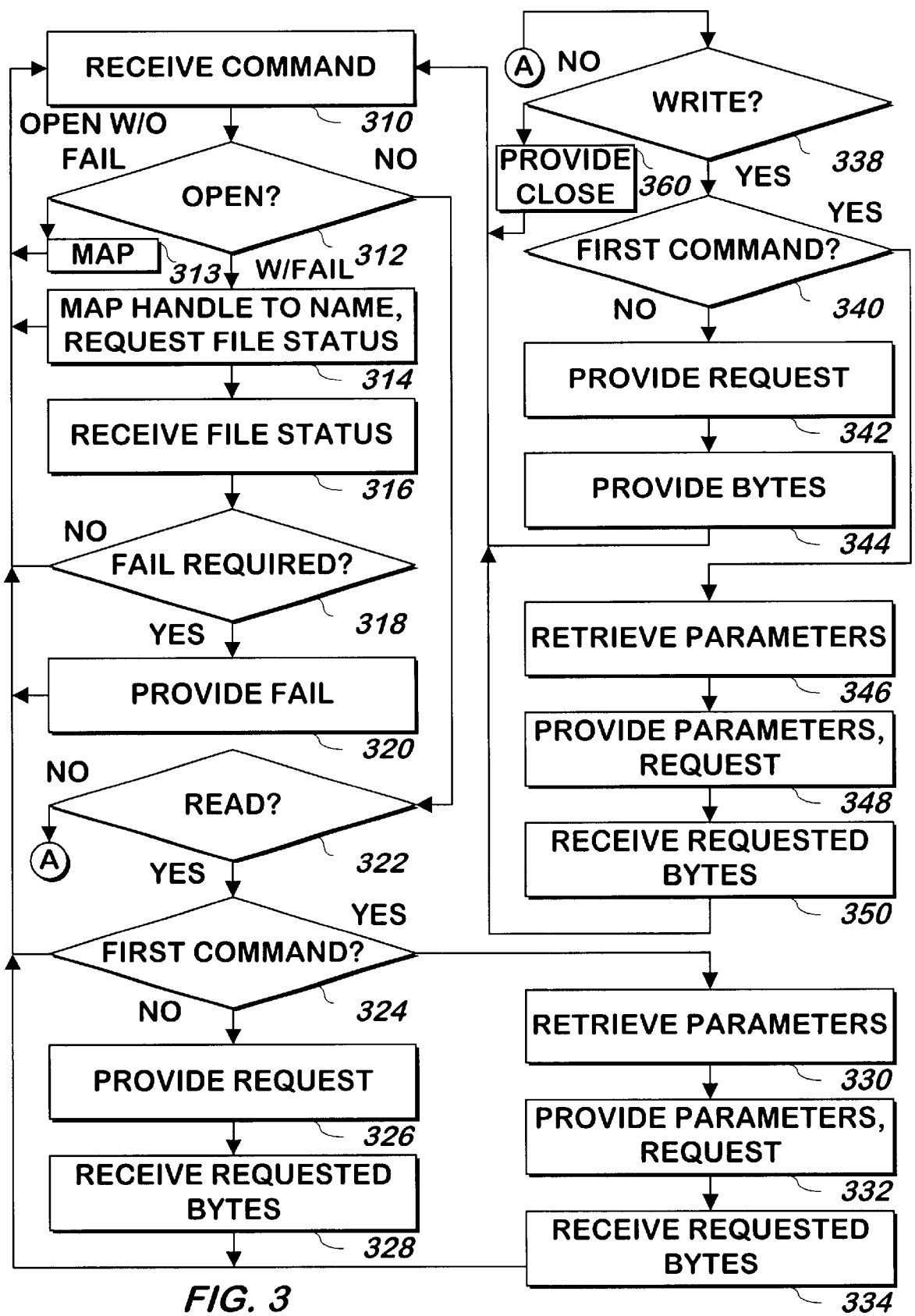
FIG. 3 is a flowchart illustrating a method of providing file requests according to one embodiment of the present invention.

Referring now to FIG. 3, a method of providing file requests is shown according to one embodiment of the present invention. A command is received 310. In one embodiment, the command received in step 310 can be an open command, a read command, a write command or a close command. If the command received in step 310 is not an open command 312, the method continues at step 322. If the command is an open command 312 the open command can be a command that can fail based on the status of the file or a different open command. If the command will not fail depending on the status of the file, the method continues at step 313. If the command is a command that fails based on the status of the file 312, the status of the file is requested by transmitting 314 the filename received in the command as a part of a status request. In one embodiment, a handle is either issued in response to the open command or received as part of the open command, and the handle is mapped to the filename and path received in the command as described above as part of step 314 or 313. Following step 313, the method continues at step 310.

The status of the file specified in the open command is received 316. If the status of the file is consistent with 318 an error or failure code according to the command received in step 310, an error code or other indication of failure is provided 320 and the method continues at step 310.

If the command is a read command 322, the method continues at step 324, otherwise, the method continues at step 338. In one embodiment, the read command received in step 310 will include a handle describing the file and a byte offset and number of bytes to read. If the command is the first read command for the file 324, the mode parameter is retrieved 330 from a registry on the client computer system using the path that was associated with the handle in the command in step 314 described above. If the mode parameter is "binary", a record size parameter is also retrieved from the registry as part of step 330. Step 330 also includes translating the handle back into a filename using the mapping performed in step 314. In another embodiment, the handle used to open the file is used as a file identifier and is passed to the mainframe the first time some action to the file is requested on the mainframe, which may occur in step 314 or step 332 or steps 348. Subsequent requests to the mainframe use this handle in place of the filename.

The filename, parameters retrieved and the information from the command are provided 332 to the mainframe as part of a read request. The requested bytes are received and provided 334 to an application that sent the command. The method continues at step 310.

In one embodiment, subsequent read commands for a file that has been read while the file is open do not require the retrieval and transmission of the parameters. Instead, such parameters are stored at the mainframe when received with the initial read command. In such embodiment, if the command is not the first read command during the time the file was opened 324, the information in the command along with a file identifier such as the filename or handle, is provided 326 to the mainframe as part of a read request. The requested bytes are received and provided 328 to an application from which the command was received and the method continues at step 310.

If the command received in step 338 is a write command 338, the method continues at step 340, otherwise, the method continues at step 360. A write command may include a file handle, an optional offset and the data to be written. If the write command is the first write command received while the file is opened 340, the type parameter and optionally the size parameter is retrieved from the registry and the parameters and a file identifier (the handle or the filename or other identifier) are provided 348 to the mainframe along with the offset if the offset is used (if the offset is not used, the bytes are assumed to be written to the end of the file) as part of a write request. The bytes to be written are provided 350 to the mainframe and the method continues at step 310.

If the write command is not the first write command received during the time the file is open 340, the information in the command is provided 342 to the mainframe along with any optional file identifiers if the handle is not used to identify the file to the mainframe, and the bytes received with the command or located at a location pointed to by a pointer received with the command in step 310 are provided 344 to the mainframe as part of a write request. The method continues at step 344.

Figure 4:
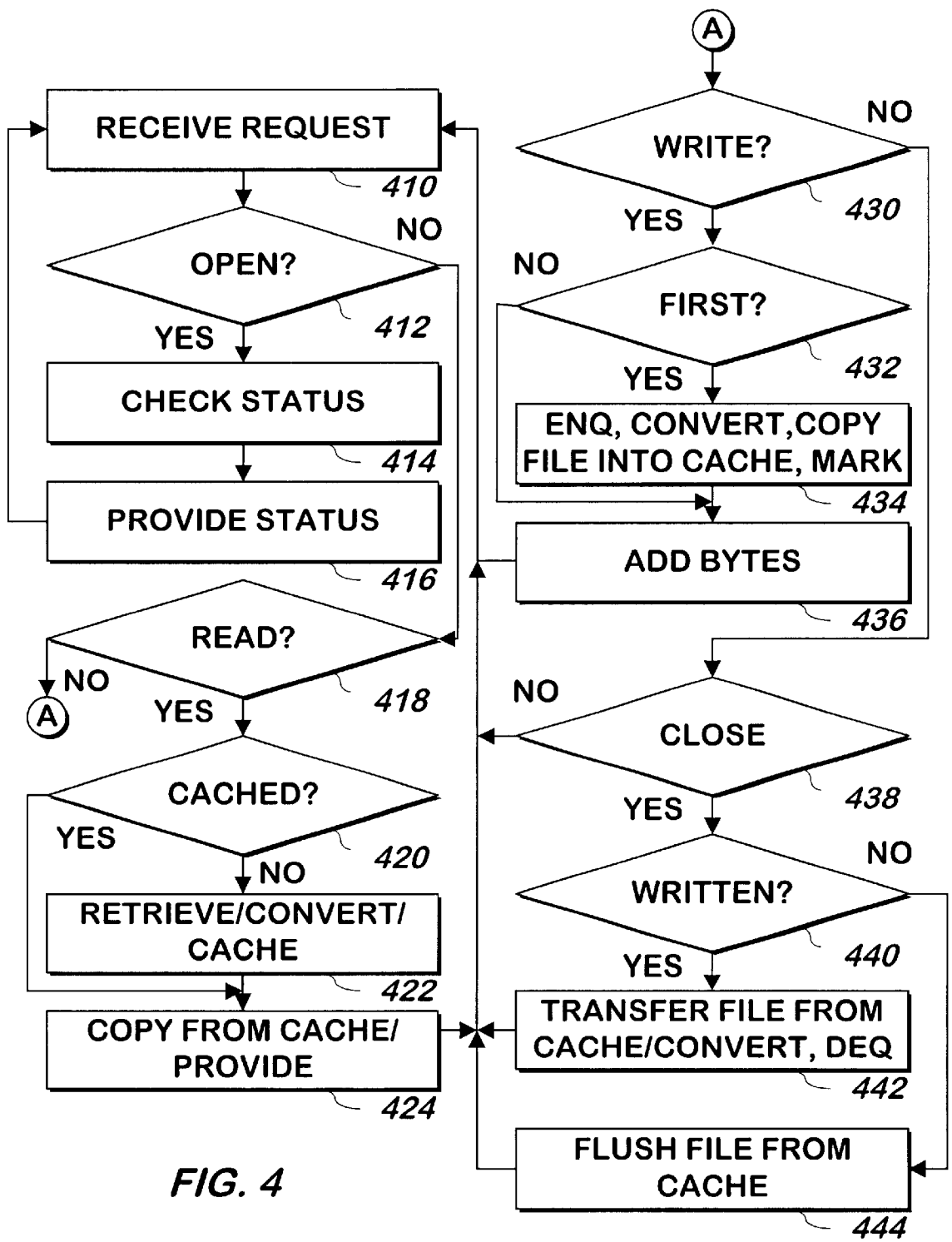
FIG. 4 is a flowchart illustrating a method of processing requests for files stored on a mainframe computer system according to one embodiment of the present invention.

Referring now to FIG. 4, a method of processing requests for files stored on a mainframe computer system is shown according to one embodiment of the present invention. A request is received 410 from a client computer system. The request may be any of the requests provided as described above with respect to FIG. 3. If the request is an open request 412, the status of the filename contained in the request is identified 414. The status may include determining whether the file exists, whether the file can be opened for reading or whether the file can be opened for writing or any other status. In one embodiment, the open request received in step 410 includes a description of the conditions for which the request should fail and step 414 includes only checking the status related only to the conditions. In another embodiment, all possible conditions are checked as part of step 414. The status identified in step 414 is provided 416 and the method continues at step 410.

If the request is a read request 418, the offset and number of bytes described in the request is identified to determine whether the portion of the file desired is in a cache 420. If the portion is in the cache, the method continues at step 424, otherwise, the portion required to respond to the request is retrieved, converted as described above and placed into the cache 422 and the method continues at step 424. In one embodiment, if the request contains the parameters described above, the parameters are used for the conversion and stored, and otherwise, parameters provided for the file identified in the request are retrieved from storage as part of step 422. In another embodiment, the parameters are provided with every request. At step 424, the portion requested is copied from the cache and provided to the requesting client computer system. The method continues at step 410.

As described above, the cache may be shared among multiple client computer systems, so that a request for a portion of a file may be supplied using the same cache. In one embodiment, this sharing is only performed if the type parameters received with the request are the same. If they are different, a separate copy of the file is cached for each set of different properties as described above.

If the request received in step 410 is a write request 430, the method continues at step 432, the method continues at step 434, otherwise, the method continues at step 438. If the write request is the first write request received for the file while the file is opened 432, otherwise, the method continues at step 436. At step 434, the file is enqueued and the entire file is converted if necessary as described above using the properties included with the request and copied into the cache 434 and the method continues at step 436. In one embodiment, step 434 also includes marking the file as having been written for use as described below. At step 436 the bytes received with the request are stored into the cache, either at the end of the file or in place of a portion of the file as described above. The method continues at step 410. As described above, if the file is being used by multiple applications, the last close command is the only command that causes the file to be closed as described above with respect to steps 440–444.

If the request received in step 410 is a close request 438, the method continues at step 440, otherwise, the method continues at step 410 or the request is processed in a different manner. At step 440, if the file was marked in step 434 as written 440, the file is transferred from the cache, converted as described above according to the properties and stored, for example on a disk as described above 442. The file is dequeued as part of step 442 and the method continues at step 410. Otherwise, the file is flushed 444 from the cache and the method continues at step 410.

What is claimed is:

1. A method of providing access to a file stored on a mainframe, the method comprising:
   receiving from a client computer system a request to provide access to a file stored on the mainframe computer system, the request comprising an offset, the offset capable of identifying a position in the file other than a block boundary;
   retrieving at least a first portion of the file using an operating system that allows access to the file solely starting on block boundaries; and
   providing access to at least a second portion of the file at the position.

2. The method of claim 1, additionally comprising converting a third portion of the file.

3. The method of claim 2 wherein the converting step is responsive to the request.

4. The method of claim 1 wherein the retrieving step comprises providing at least a third portion of the file to a storage area on the mainframe.

5. The method of claim 1 wherein the retrieving step comprises writing a third portion of the file.

6. The method of claim 5 wherein the writing step comprises writing to a storage area other than a storage area from which the file was retrieved.

7. The method of claim 6 wherein the writing step additionally comprises copying the file to the storage area.

8. The method of claim 6 wherein the writing step comprises converting the file.

9. The method of claim 1 additionally comprising:
   receiving a command to access the file, the command specifying a path and filename;
   reading at least one property of the file stored in a registry responsive to the path; and
   transmitting from a client computer to the mainframe a request to access the file responsive to the at least one property read and the command received.

10. A computer program product comprising a computer useable medium having computer readable program code embodied therein for providing access to a file stored on a mainframe, the computer program product comprising:
    computer readable program code devices configured to cause a computer to receive from a client computer system a request to provide access to a file stored on the mainframe computer system, the request comprising an offset, the offset capable of identifying a position in the file other than a block boundary;
    computer readable program code devices configured to cause a computer to retrieve at least a first portion of the file using an operating system that allows access to the file solely starting on block boundaries; and
    computer readable program code devices configured to cause a computer to provide access to at least a second portion of the file at the position.

11. The computer program product of claim 10, additionally comprising computer readable program code devices configured to cause a computer to convert a third portion of the file.

12. The computer program product of claim 11 wherein the computer readable program code devices configured to cause a computer to convert are responsive to the request.

13. The computer program product of claim 10 wherein the computer readable program code devices configured to cause a computer to retrieve comprise computer readable program code devices configured to cause a computer to provide at least a third portion of the file to a storage area on the mainframe.

14. The computer program product of claim 10 wherein the computer readable program code devices configured to cause a computer to retrieve comprise computer readable program code devices configured to cause a computer to write a third portion of the file.

15. The computer program product of claim 14 wherein the computer readable program code devices configured to cause a computer to write step comprise computer readable program code devices configured to cause a computer to write to a storage area other than a storage area from which the file was retrieved.

16. The computer program product of claim 15 wherein the computer readable program code devices configured to cause a computer to write additionally comprise computer readable program code devices configured to cause a computer to copy the file to the storage area.

17. The computer program product of claim 15 wherein the computer readable program code devices configured to cause a computer to write comprise computer readable program code devices configured to cause a computer to convert the file.

18. The computer program product of claim 10 additionally comprising:
    computer readable program code devices configured to cause a computer to receive a command to access the file, the command specifying a path and filename;
    computer readable program code devices configured to cause a computer to read at least one property of the file stored in a registry responsive to the path; and
    computer readable program code devices configured to cause a computer to transmit from a client computer to the mainframe a request to access the file responsive to the at least one property read and the command received.

19. An apparatus for providing random access to a file stored in a mainframe computer system, the apparatus comprising
    a mainframe accessor having a first input/output operatively coupled for receiving a file access request for a mainframe file stored using an operating system that allows access to the file only on block boundaries, the request comprising an offset capable of identifying a position in the file other than a block boundary, the mainframe accessor for providing an identifier of the mainframe file at a mainframe accessor second input/output responsive to the request received at the mainframe accessor first input/output, for retrieving at a third input/output at least a portion of the mainframe file responsive to the request received at the first input/output, and for providing at the first input/output the portion of the mainframe file received at the mainframe accessor third input/output;
    a formatter having a first input/output coupled to the mainframe accessor second input/output for receiving the identifier of the mainframe file and the set of conversion information, the formatter for requesting and receiving at a second input/output at least a first portion of the mainframe file, and for providing to an output a second portion of the mainframe file corresponding to the at least a portion of the mainframe file received at the formatter second input/output; and
    a cache having an input/output coupled to the formatter output for receiving the at least the second portion of the mainframe file and coupled to the mainframe accessor third input/output for receiving the request and providing a third portion of the mainframe file responsive to the request.

20. The apparatus of claim 19 additionally comprising:

a registry having an input/output for receiving a path identifier, the registry for, responsive to the path identifier, providing at the registry input/output at least one property stored for the path identifier; and an accessor located in a client computer system different from the mainframe computer system, the accessor having a first input/output for receiving a command to access a file, the command corresponding to a file, the file corresponding to a path, having a second input/output coupled to the registry input/output and a third input/output coupled to the mainframe accessor first input/output, the accessor for providing at the accessor second input/output a path identifier responsive to the command received at the accessor first input/output, for receiving at the second input/output the at least one property, for generating and providing at the third input/output an access request responsive to the at least one property received at the accessor second input/output, for receiving at the accessor third input/output the at least the portion of the mainframe file, and for providing at the accessor first input/output the at least the portion of the mainframe file received at the accessor third input/output.

21. The apparatus of claim 20 wherein the command to access the file is a read command.

22. The apparatus of claim 20 wherein the command to access the file is a write command.

23. The apparatus of claim 20, wherein:

the mainframe accessor receives the at least one property at the first input/output and provides the at least one property at the second input/output; and the formatter receives the at least one property at the formatter first input/output and the formatter is additionally for adjusting responsive to the at least one property the at least the first portion of the file received at the formatter second input/output to produce the at least the second portion of the mainframe file.

* * * * *